(12) United States Patent
Gu et al.

(10) Patent No.: US 11,238,315 B2
(45) Date of Patent: Feb. 1, 2022

(54) IMAGE CLASSIFICATION METHOD, PERSONALIZED RECOMMENDATION METHOD, COMPUTER DEVICE AND STORAGE MEDIUM

(71) Applicant: Tencent Technology (Shenzhen) Company Limited, Shenzhen (CN)

(72) Inventors: Jiawei Gu, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 191 days.

(21) Appl. No.: 16/675,831

(22) Filed: Nov. 6, 2019

(65) Prior Publication Data
US 2020/0074243 A1 Mar. 5, 2020

Related U.S. Application Data

(63) Continuation of application No. PCT/CN2018/106196, filed on Sep. 18, 2018.

(30) Foreign Application Priority Data

Nov. 30, 2017 (CN) .......................... 201711244572.4

(51) Int. Cl.
*G06K 9/62* (2006.01)
*G06K 9/46* (2006.01)
*G06N 3/04* (2006.01)

(52) U.S. Cl.
CPC ............. *G06K 9/6267* (2013.01); *G06K 9/46* (2013.01); *G06K 9/623* (2013.01); *G06K 9/629* (2013.01);
(Continued)

(58) Field of Classification Search
CPC ........ G06K 9/6267; G06K 9/46; G06K 9/623; G06K 9/6231; G06K 9/6232; G06K 9/629;
(Continued)

(56) References Cited

U.S. PATENT DOCUMENTS 10,198,671 B1 *  2/2019  Yang ......................... G06T 7/11
2014/0067679 A1 *  3/2014  O'Reilly .......... G06Q 20/40145
                                                    705/44
(Continued)

FOREIGN PATENT DOCUMENTS

CN      102542067 A      7/2012
CN      103281477 A      9/2013
(Continued)

OTHER PUBLICATIONS

Chinese Office Action with concise English translation regarding 201711244572.4 dated Apr. 2, 2021, 9 pages.
(Continued)

*Primary Examiner* — Dhaval V Patel
(74) *Attorney, Agent, or Firm* — Crowell & Moring LLP

(57) ABSTRACT

The present disclosure describes a method, device, and non-transitory computer readable storage medium for classifying an input image. The method includes extracting, by a device, a global feature of a input image. The method includes determining, by the device, a local critical area of the input image based on the input image and the global feature; and extracting, by the device, a local feature of the local critical area. The method includes obtaining, by the device, a correlation feature of the input image based on the global feature of the input image and the local feature of the local critical area of the input image. The method includes classifying, by the device, the input image to obtain a classification result based on the global feature of the input (Continued)

image, the local feature of the local critical area, and the correlation feature of the input image.

17 Claims, 16 Drawing Sheets

(52) U.S. Cl.
CPC ......... *G06K 9/6231* (2013.01); *G06K 9/6232* (2013.01); *G06N 3/0454* (2013.01)

(58) Field of Classification Search
CPC ............... G06K 9/6228; G06K 9/4628; G06K 9/00624; G06K 9/627; G06K 9/4671; G06N 3/0454; G06N 3/08; G06F 16/5838; G06F 16/583
See application file for complete search history.

(56) References Cited

U.S. PATENT DOCUMENTS

| | | | |
|---|---|---|---|
| 2015/0139485 A1* | 5/2015 | Bourdev | G06K 9/6292 382/103 |
| 2015/0242707 A1* | 8/2015 | Wilf | G06K 9/6256 382/159 |
| 2017/0018075 A1 | 1/2017 | Middlebrooks et al. | |
| 2017/0294040 A1 | 10/2017 | Song | |

FOREIGN PATENT DOCUMENTS

| | | |
|---|---|---|
| CN | 105608230 A | 5/2016 |
| CN | 105956631 A | 9/2016 |
| CN | 106408037 A | 2/2017 |
| CN | 106803090 A | 6/2017 |
| CN | 107066520 A | 8/2017 |
| CN | 107203775 A | 9/2017 |
| CN | 108304847 A | 7/2018 |
| CN | 110580482 A | 12/2019 |

OTHER PUBLICATIONS

Zou et al., "Scene classification using local and global features with collaborative representation fusion," Information Sciences 348, 2016, 18 pages.
Runjie Liu, "Investigation on image search algorithm based on global and local features," (with Abstract), Chinese Outstanding Master Thesis Database, Information Technology. Vol. 3, Mar. 15, 2017, 55 pages.
Yongjie Wang, "Research on Face Image Retrieval by Combination Global Feature and Local Feature," (with Abstract), Liaoning University, Thesis for Master Degree, May 26, 2014, 61 pages.
Hong et al., "Image Classification with Local Linear Decoding and Global Multi-feature Fusion," Pacific Rim Conference on Multimedia, PCM2015: Advances in Multimedia Information Processing-PCM 2015, 13 pages.
International Search Report and Written Opinion dated Dec. 26, 2018 for PCT Application No. PCT/CN2018/106196 (10 pp.).

* cited by examiner

IMAGE CLASSIFICATION METHOD, PERSONALIZED RECOMMENDATION METHOD, COMPUTER DEVICE AND STORAGE MEDIUM

RELATED APPLICATION

This application is a continuation application of PCT Patent Application No. PCT/CN2018/106196, filed on Sep. 18, 2018, which claims priority to Chinese Patent Application No. 201711244572.4, filed with the Chinese Patent Office on Nov. 30, 2017, both of which are incorporated herein by reference in their entireties.

FIELD OF THE TECHNOLOGY

This application relates to the field of image processing technologies, and in particular, to an image classification method, a personalized recommendation method, a computer device and a storage medium.

BACKGROUND OF THE DISCLOSURE

Currently, different kinds of images are provided by various systems, software and websites for users to select. To help the users search for images conveniently, an image classification function is provided.

In the related image classification method, image features are obtained by analyzing images, and the images are classified according to the image features and a classification algorithm. However, the image features used in the related image classification method lack variety, which leads to low classification accuracy during classification.

SUMMARY

According to embodiments provided in this application, an image classification method, a personalized recommendation method, a computer device and a storage medium are provided.

The present disclosure describes an embodiment of a method for classifying an input image. The method includes extracting, by a device, a global feature of a input image. The device includes a memory storing instructions and a processor in communication with the memory. The method includes determining, by the device, a local critical area of the input image based on the input image and the global feature of the input image; and extracting, by the device, a local feature of the local critical area of the input image. The method includes obtaining, by the device, a correlation feature of the input image based on the global feature of the input image and the local feature of the local critical area of the input image. The method includes classifying, by the device, the input image to obtain a classification result based on the global feature of the input image, the local feature of the local critical area of the input image, and the correlation feature of the input image.

The present disclosure describes an embodiment of a computer device for classifying an input image. The computer device includes a memory storing instructions; and a processor in communication with the memory. When the instructions are executed by the processor, the instructions are configured to cause the computer device to perform extracting a global feature of an input image; and determining a local critical area of the input image based on the input image and the global feature of the input image. When the instructions are executed by the processor, the instructions are configured to cause the computer device to perform extracting an local feature of the local critical area of the input image; and obtaining a correlation feature of the input image based on the global feature of the input image and the local feature of the local critical area of the input image. When the instructions are executed by the processor, the instructions are configured to cause the computer device to perform classifying the input image to obtain a classification result based on the global feature of the input image, the local feature of the local critical area of the input image and the correlation feature of the input image.

The present disclosure describes an embodiment of a non-transitory computer readable storage medium storing computer readable instructions. The computer readable instructions, when executed by a processor, are configured to cause the processor to perform extracting a global feature of an input image; and determining a local critical area of the input image based on the input image and the global feature of the input image. The computer readable instructions, when executed by a processor, are configured to cause the processor to perform extracting an local feature of the local critical area of the input image; and obtaining a correlation feature of the input image based on the global feature of the input image and the local feature of the local critical area of the input image. The computer readable instructions, when executed by a processor, are configured to cause the processor to perform classifying the input image to obtain a classification result based on the global feature of the input image, the local feature of the local critical area of the input image and the correlation feature of the input image.

The present disclosure describes an embodiment of a personalized recommendation method, the method being implemented by a computer device and including the following operations: obtaining a classification result corresponding to an input image, the classification result being determined by extracting a global feature of the input image; determining a local critical area of the input image according to the input image and the global feature of the input image; extracting a local feature of the local critical area of the input image; obtaining a correlation feature of the input image according to the global feature of the input image and the local feature of the local critical area of the input image; and classifying the input image according to the global feature of the input image, the local feature of the local critical area of the input image and the correlation feature of the input image; searching for to-be-recommended information corresponding to the classification result; and pushing the recommendation information.

The present disclosure describes an embodiment of a computer device, including a memory and a processor, the memory storing a computer program. The computer program, when executed by the processor, causing the processor to perform the following operations: obtaining a classification result corresponding to a to-be-classified image, the classification result being determined by extracting a global feature of the to-be-classified image; determining a local critical area of the to-be-classified image according to the input image and the global feature of the input image; extracting a local feature of the local critical area of the input image; obtaining a correlation feature of the input image according to the global feature of the input image and the local feature of the local critical area of the input image; and classifying the input image according to the global feature of the input image, the local feature of the local critical area of the input image and the correlation feature of the input image; searching for to-be-recommended information corresponding to the classification result; and pushing the recommendation information.

The present disclosure describes an embodiment of one or more non-volatile storage mediums storing a computer program. The computer program, when executed by one or more processors, are configured to cause the one or more processors to perform the following operations: obtaining a classification result corresponding to an input image, the classification result being determined by extracting a global feature of the input image; determining a local critical area of the input image according to the input image and the global feature of the input image; extracting a local feature of the local critical area of the input image; obtaining a correlation feature of the input image according to the global feature of the input image and the local feature of the local critical area of the input image; and classifying the input image according to the global feature of the input image, the local feature of the local critical area of the input image and the correlation feature of the input image; searching for to-be-recommended information corresponding to the classification result; and pushing the recommendation information.

The image classification method, the personalized recommendation method, the computer device and the storage medium classify the input image according to the global feature, the local feature of the local critical area and the correlation feature. That is, in a process of image classification, not only the global feature but also the local feature of the local critical area is considered, thus enriching local feature information on which image classification is based. When image classification is performed according to the rich feature information, the classification may be accurate, thus improving the accuracy of image classification. Subsequently, to-be-recommended object information may be accurately obtained and pushed based on the classification result, thereby realizing accurate recommendation.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific implementations described herein are merely used to explain this application but are not intended to limit the protection scope of this application.

Figure 1:
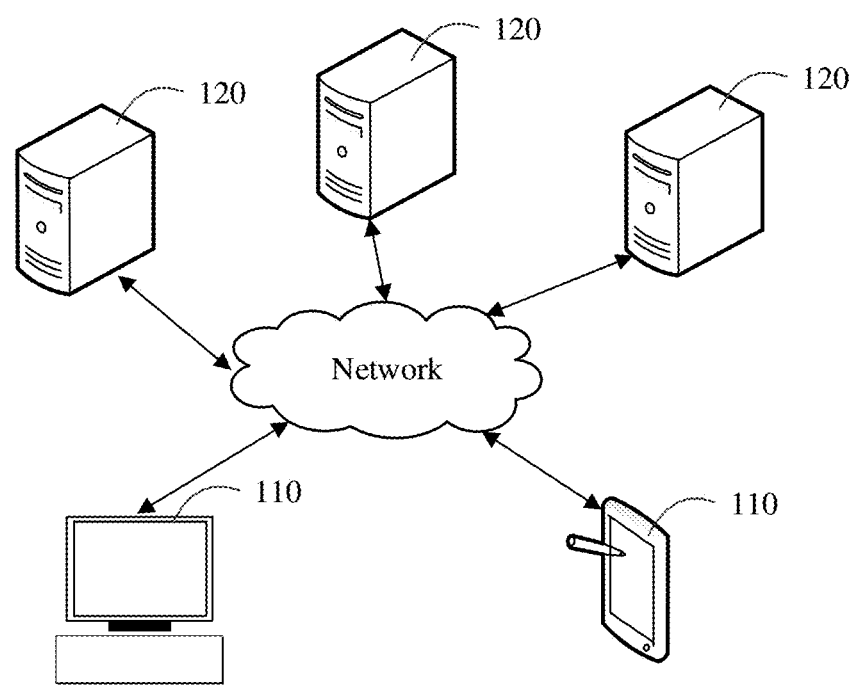
FIG. 1 is a schematic diagram of an application environment of an image classification method according to an embodiment of this application.

FIG. 1 is a schematic diagram of an application environment of an image classification method according to an embodiment of this application. Referring to FIG. 1, the application environment refers to a terminal 110 and a server 120. The terminal 110 may communicate with the server 120 by using a network. The terminal 110 may be a desktop terminal or a mobile terminal, and the mobile terminal may include, but is not limited to, a mobile phone, a tablet computer, a notebook computer, and the like. The server 120 may be implemented by using an independent server or a server cluster including a plurality of servers. The image classification method may be applied to the server 120 or the terminal 110, and when the image classification method is applied to the server 120, the terminal 110 may access the corresponding server 120 by using the network, to request a corresponding classification result, the server 120 may push the classification result to the terminal 110, and users of the terminal 110 may perform image searching and downloading according to the classification result.

Figure 2:
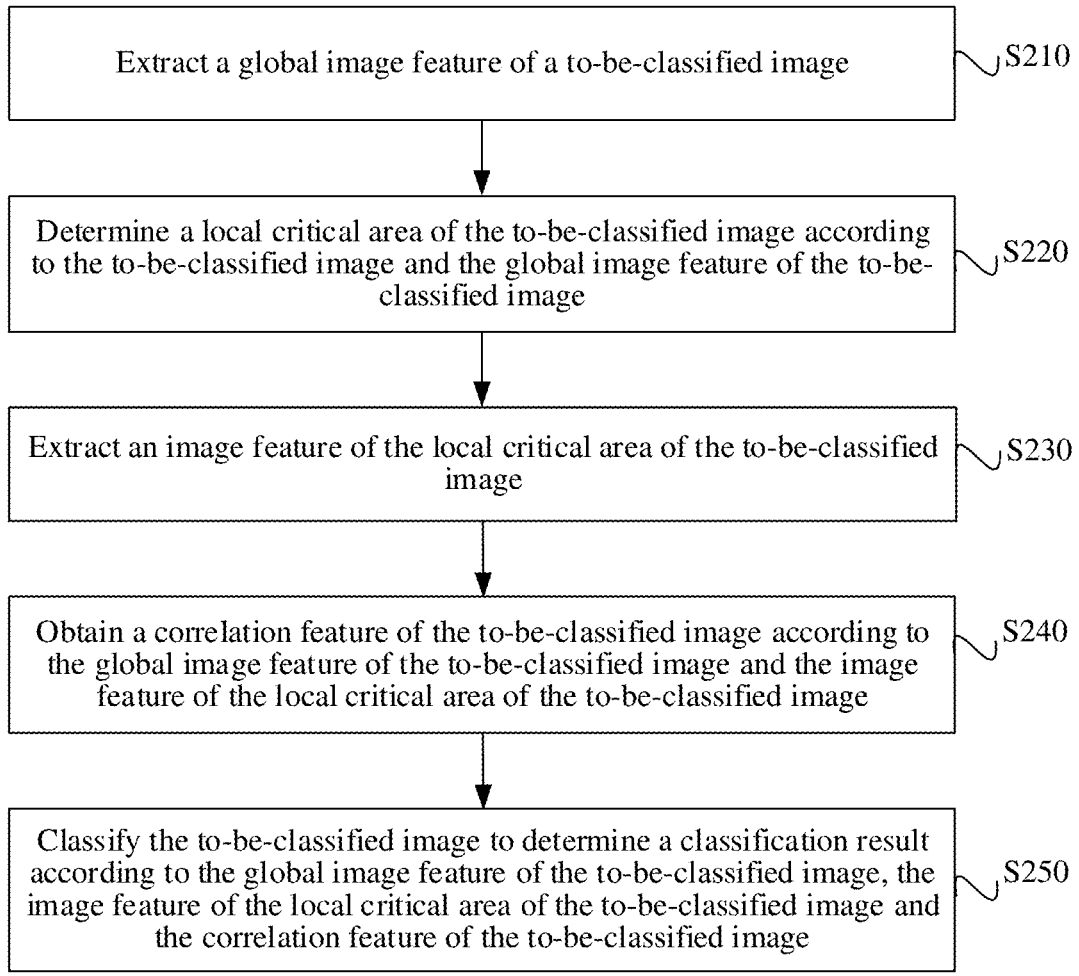
FIG. 2 is a schematic flowchart of an image classification method according to an embodiment.

As shown in FIG. 2, in an embodiment, an image classification method is provided. This embodiment is mainly illustrated by using an example that the method is applied to the server 120 (or the terminal 110) in FIG. 1. Referring to FIG. 2, the image classification method specifically includes steps S210 to S250.

S210: Extract a global image feature of a to-be-classified image. The global image feature may refer as the global feature.

An image feature is information that represents an image characteristic, including a global feature and a local feature. The global feature refers to a feature that may represent an entire image and is used to describe an overall feature of the image. The local feature, relative to the global feature, refers to a local expression of the image feature and reflects a local specificity in the image. In this embodiment, the global feature of the to-be-classified image is extracted as one of features on which subsequent classification is based. In this embodiment, the global feature may be a feature matrix. In some implementation, the global feature may refer to as the global image feature, and the local feature may refer to as the local image feature.

S220: Determine a local critical area of the to-be-classified image according to the to-be-classified image and the global feature of the to-be-classified image.

The local critical area is a partial area in the to-be-classified image. The global feature includes image features of sub-areas, and the local critical area may be determined from the to-be-classified image through the global feature. Different kinds of images may have the same overall feature, and classification merely based on the global feature easily leads to a classification error. To obtain accurate classification, it is critical to find a local area with some subtle differences. In this embodiment, on a basis that the global feature is obtained, the local critical area of the to-be-classified image is determined, that is, the corresponding local critical area is extracted from the image.

S230: Extract an image feature of the local critical area of the to-be-classified image. The image feature of the local critical area may refer as the local feature of the local critical area.

After the local critical area is determined, feature extraction needs to be performed on the local critical area, to obtain the local feature of the local critical area, that is, a local image feature representing a partial area in the to-be-classified image.

S240: Obtain a correlation feature of the to-be-classified image according to the global feature of the to-be-classified image and the local feature of the local critical area of the to-be-classified image.

The global feature and the local feature of the local critical area are features obtained by processing the same to-be-classified image, and are definitely correlated. Therefore, in this embodiment, the correlation feature between the global feature and the local feature of the local critical area further needs to be obtained. The correlation feature refers to a feature indicating a correlation between features, may further represent the features of the to-be-classified image, and is used as one of the features on which the subsequent classification is based. The correlation between the global feature and the local feature of the local critical area is taken into consideration, thus improving the accuracy of image classification.

S250: Classify the to-be-classified image to determine a classification result according to the global feature of the to-be-classified image, the local feature of the local critical area of the to-be-classified image and the correlation feature of the to-be-classified image.

That is, the global feature, the local feature of the local critical area and the correlation feature of the to-be-classified image are used as the features on which classification is based. After being combined, the features may represent the image more thoroughly. Not only the whole image but also the correlation between the whole image and the local area is taken into consideration, so that an accurate classification result may be obtained when classification is performed accordingly.

In the foregoing image classification method, the to-be-classified image is classified according to the global feature, the local feature of the local critical area and the correlation feature of the to-be-classified image. That is, in a process of image classification, not only the global feature but also the local feature of the local critical area is considered, thus enriching image feature information on which image classification is based. When image classification is performed according to the rich feature information, the classification may be accurate, thus improving the accuracy of image classification.

In an embodiment, the image classification method may be a fine-grained image classification method, which may be used for classification of a fine-grained image.

Figure 3:
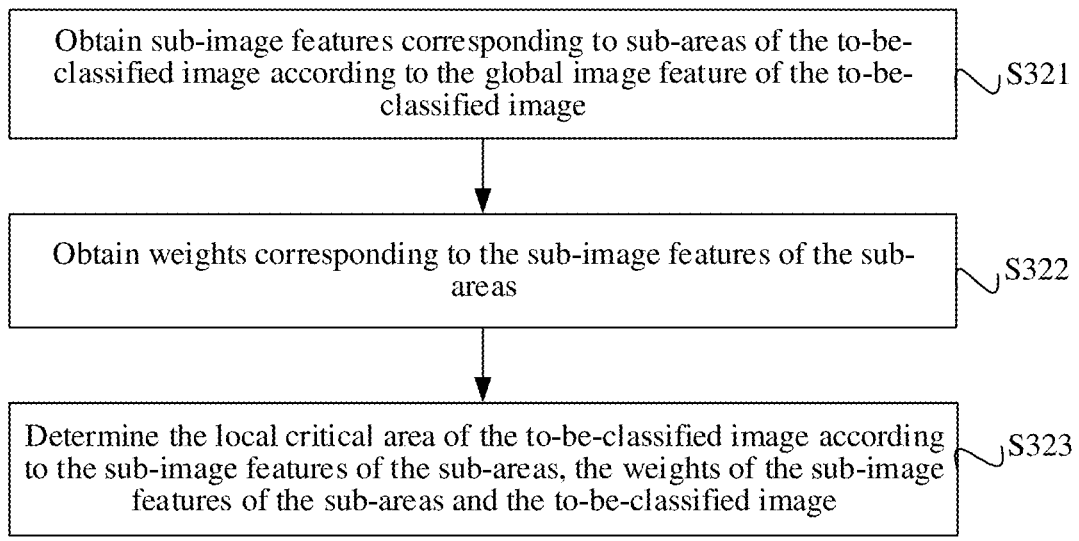
FIG. 3 is a schematic sub-flowchart of step S220 in an image classification method according to another embodiment.

As shown in FIG. 3, in one of the embodiments, step S220 of determining a local critical area of the to-be-classified image according to the to-be-classified image and the global feature of the to-be-classified image includes the following steps:

S321: Obtain sub-image features corresponding to sub-areas of the to-be-classified image according to the global feature of the to-be-classified image.

The sub-areas together may form the entire to-be-classified image. The global feature includes the sub-image features of the sub-areas. After the global feature of the to-be-classified image is obtained, the sub-image features corresponding to the sub-areas in the to-be-classified image may be obtained according to the global feature. It may be appreciated that, any one of the sub-image features corresponding to the to-be-classified image corresponds to a sub-area. For example, a global feature corresponding to a to-be-classified image Ig is 28×28 512-dimensional vectors, which may be understood as 512 feature graphs each having a size of 28×28. There are 28×28 feature vectors, and each feature vector includes 512 feature elements. The 28×28 feature vectors form the global feature of the to-be-classified image Ig, where each feature vector corresponds to a sub-image feature of a sub-area. Therefore, the sub-image features corresponding to the sub-areas may be obtained according to the global feature of the to-be-classified image Ig.

S322: Obtain weights corresponding to the sub-image features of the sub-areas.

The sub-image feature of the sub-area is a feature representation of the sub-area of the to-be-classified image. To measure the importance of the sub-areas, in this embodiment, it is necessary to assign weights to the sub-image features of the sub-areas. The greater the weight is, the more important the sub-area is.

S323: Determine the local critical area of the to-be-classified image according to the sub-image features of the sub-areas, the weights of the sub-image features of the sub-areas and the to-be-classified image.

After the weights corresponding to the sub-image features of the sub-areas are obtained, the importance of the sub-areas is known, and then the corresponding local critical area may be extracted from the to-be-classified image. In this way, in the process of determining the local critical area, the weights of the sub-image features of the sub-areas are considered, which ensure the accuracy of the local critical area, thus further improving the accuracy of the subsequent classification. In an embodiment, a sub-area with the greatest weight among the sub-areas may be selected as the local critical area, or sub-areas with weights greater than a preset value may be selected from the sub-areas, and the local critical area may be determined according to the sub-areas with the weights greater than the preset value. Because the sub-areas with the weights greater than the preset value may overlap with each other, a union set of the sub-areas with the weights greater than the preset value may be calculated, to obtain the local critical area.

It may be appreciated that, the process of obtaining weights corresponding to the sub-image features of the sub-areas and determining the local critical area of the to-be-classified image according to the sub-image features of the sub-areas, the weights of the sub-image features of the sub-areas and the to-be-classified image is a process of determining the local critical area according to an attention mechanism.

Figure 4:
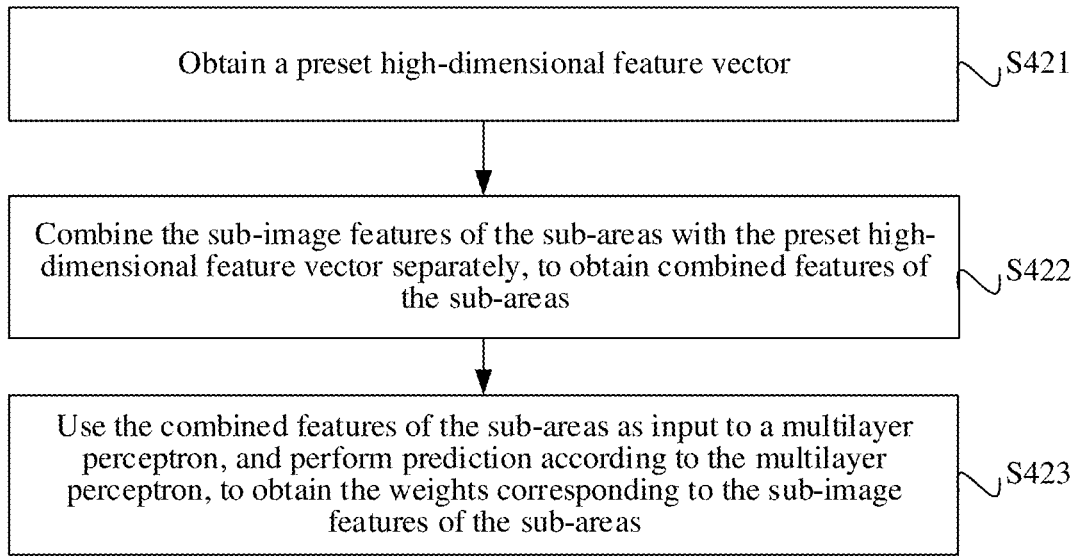
FIG. 4 is a schematic sub-flowchart of step S322 in an image classification method according to another embodiment.

As shown in FIG. 4, in an embodiment, step S322 of obtaining weights corresponding to the sub-image features of the sub-areas includes the following steps:

S421: Obtain a preset high-dimensional feature vector.

In an embodiment, the preset high-dimensional feature may be a sub-image feature corresponding to a sample image in a preset local critical area and obtained according to a convolutional feature, where the convolutional feature is obtained by processing the sample image according to a convolutional neural network in advance. Dimensions of the preset high-dimensional feature are the same as dimensions of the sub-image feature of the sub-area of the to-be-classified image.

S422: Combine the sub-image features of the sub-areas with the preset high-dimensional feature vector separately, to obtain combined features of the sub-areas.

It may be appreciated that, the sub-image features of the sub-areas are separately spliced with the preset high-dimensional feature vector. A quantity of elements in the combined feature is a sum of a quantity of elements of the sub-image feature of the sub-area and a quantity of elements in the preset high-dimensional feature vector.

S423: Use the combined features of the sub-areas as input to a multilayer perceptron (MLP), and perform prediction according to the MLP to obtain the weights corresponding to the sub-image features of the sub-areas.

The multilayer perceptron (MLP) is a feed-forward artificial neural network model, which maps a plurality of input datasets to a single output dataset. In this embodiment, a quantity of nodes of an input layer of the MLP is the same as the quantity of elements in the combined feature. A combined feature of a sub-area is used as input to the MLP, and the inputted combined feature is mapped to a single output dataset according to the MLP, to obtain the weight of the sub-image feature of one sub-area. The foregoing mapping process is repeated on the combined features of the sub-areas, to obtain the weights corresponding to the sub-image features of the sub-areas.

In an embodiment, a formula for obtaining the weights corresponding to the sub-image features of the sub-areas is as follows:

$$\partial_i = MLP(h_i) \ 1 \le i \le M \times M.$$

$\partial_i$ is a weight of a sub-image feature of an $i^{th}$ sub-area of a to-be-classified image; $h_i$ is a combined feature of the $i^{th}$ sub-area of the to-be-classified image, where $h_i$ is generated by combining a sub-image feature $z_i$ of the $i^{th}$ sub-area of the to-be-classified image and a preset high-dimensional feature vector γ; MLP is a multilayer perceptron, representing that $h_i$ is used as input to the MLP, and the MLP performs prediction according to the input to obtain an output result, where the output result is $\partial_i$. The global feature corresponding to the to-be-classified image is a feature with L×M×M dimensions, where L and M are positive integers greater than or equal to 1. The feature may be understood as M×M L-dimensional vectors. Each sub-area corresponds to a sub-image feature. In this case, $\partial_i$ may be further understood as an $i^{th}$ sub-image feature in the global feature, and a quantity of elements in the sub-image feature is L. In an embodiment, L may be 512, and M may be 28.

In one of the embodiments, before the MLP performs prediction to obtain the weight, training is needed to obtain the MLP, that is, before step S423, the MLP needs to be obtained in advance. Therefore, before the combined features of the sub-areas are used as the input to the MLP, the following steps are further included: extracting a global feature of each sample image; obtaining sub-image features corresponding to the sub-areas of the sample image according to the global feature of the sample image; performing weight initialization on the sub-image features of the sub-areas of the sample image, to obtain initial weights corresponding to the sub-image features of the sub-areas; obtaining an image context vector of each sample image according to the sub-image features of the sub-areas of the sample image and the initial weights of the sub-image features of the sub-areas; weighting the image context vectors, to obtain weighted image context vectors; combining the weighted image context vectors with a preset high-dimensional feature vector separately, to obtain training input features; obtaining an initial MLP; and training the initial MLP according to the training input features corresponding to the sample images, to obtain the MLP.

The sample image may be understood as an image for training, and is a known classified image. The foregoing steps in this embodiment are a process of training the MLP. A process of obtaining the global feature of the sample image is similar to the foregoing process of obtaining the global feature of the to-be-classified image. In addition, an obtaining process of obtaining the sub-image features corresponding to the sub-areas of the sample image is similar to the foregoing process of obtaining the sub-image features corresponding to the sub-areas of the to-be-classified image, except that the images are different: the former process relates to the sample image, and the latter process relates to the to-be-classified image.

The image context vector is a feature representation of a significant area of the to-be-classified image, and may be understood as a feature representation of the local critical area. After the initial weights of the sub-image features of the sub-areas of the sample image are obtained, the sub-image features of the sub-areas of the sample image may be processed according to the initial weights of the sub-image features of the sub-areas of the sample image, to obtain the image context vector.

In an embodiment, a formula for obtaining the image context vector S is:

$$S = \sum_{i=1}^{M \times M} q_i a_i.$$

$q_i$ is a sub-image feature of an $i^{th}$ sub-area of a sample image, $a_i$ is an initial weight of the sub-image feature of the $i^{th}$ sub-area of the sample image.

A formula for obtaining the weighted image context vector R is:

$$R = \beta \cdot S.$$

$\beta$ is a weight of an image context vector, and a weighted image context vector R may be obtained by weighting the image context vector.

Further, a training input feature is obtained by combining the weighted image context vector R and the preset high-dimensional feature vector $\gamma$. Because there is a plurality of sample images, training input features may be obtained, and an initial MLP is trained according to the training input features, to obtain the MLP. Specifically, during training, a softmax regression function $\sigma_s$ is used for training, and a training result label label1 is shown through the following formula:

$$\text{label1} = \text{Arg max}(\sigma_s(R, W1, b1)).$$

W1 is a weight matrix, b1 is a bias vector, and Arg max (f(e)) is a corresponding value of a variable f(e) in a case that e is maximized.

Figure 5:
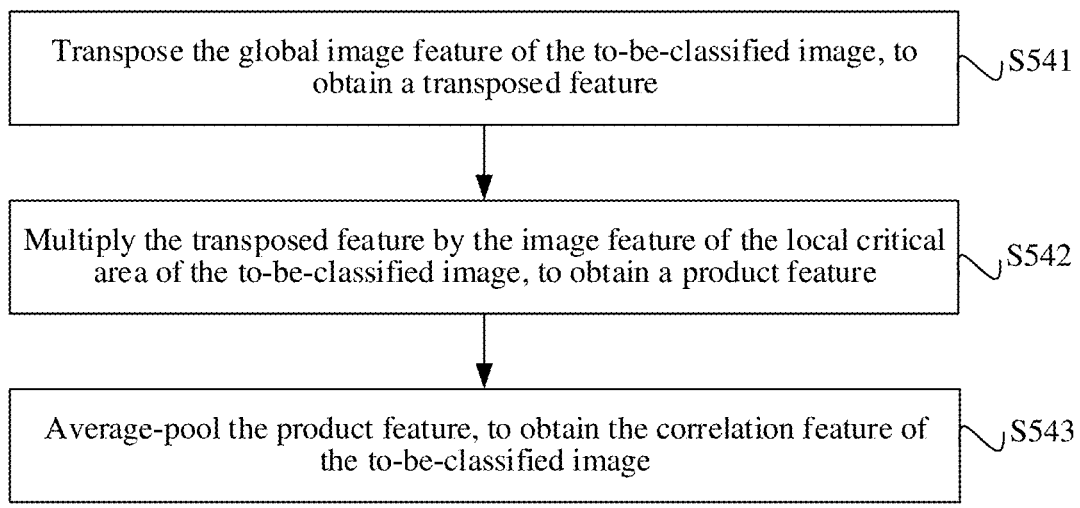
FIG. 5 is a schematic sub-flowchart of step S240 in an image classification method according to another embodiment.

As shown in FIG. 5, in one of the embodiments, step S240 of obtaining a correlation feature of the to-be-classified image according to the global feature of the to-be-classified image and the local feature of the local critical area of the to-be-classified image includes the following steps:

S541: Transpose the global feature of the to-be-classified image, to obtain a transposed feature.

For a matrix, a process of turning the first row into the first column, turning the second row into the second column . . . , and turning the last row into the last column, to obtain a new matrix is referred to as transposition of the matrix. Because there is a valuable connection between different feature dimensions of an image, to find effective correlation information existing between the global feature and the local feature of the local critical area, a correlation between the global feature and the local feature of the local critical area needs to be obtained according to a dot product of different feature dimensions (for example, a row and a column represent different feature dimensions) between the global feature and the local feature of the local critical area. Therefore, the global feature first is transposed to obtain the transposed feature.

S542: Multiply the transposed feature by the local feature of the local critical area of the to-be-classified image, to obtain a product feature.

For a matrix a and a matrix b, a size of the matrix a is m rows and n columns, and a size of the matrix b is n rows and m columns. A size of a matrix result after the matrix a is multiplied by the matrix b is m rows and m columns, and a value of a point located in an $i^{th}$ row and a $j^{th}$ column in the matrix result is a sum of n products obtained by correspondingly multiplying n numbers in an $i^{th}$ row in the matrix a by n numbers in a $j^{th}$ column in the second matrix.

Multiplying the transposed feature by the local feature of the local critical area includes: correspondingly multiplying elements in one row of the transposition matrix by elements in each column of the local feature of the local critical area to obtain a product, and calculating a sum of the products to obtain a row of product features, and the product feature is obtained after the foregoing operation of calculating a sum of products is performed on all the rows of the transposition matrix. Therefore, products of different feature dimensions between the global feature and the local feature of the local critical area are realized, to obtain correlated features, that is, the product feature.

Specifically, a formula for obtaining a product feature X is as follows:

$$X = A^T B.$$

A is a global feature of a to-be-classified image, B is a local feature of a local critical area of the to-be-classified image, and $A^T$ is a transposed feature. $A_i, B_j \in R^{M \times M}$, $A_i$ is an $i^{th}$ feature vector in the global feature A of the to-be-classified image, and $B_j$ is a $j^{th}$ feature vector in the image feature B of the local critical area of the to-be-classified image.

S543: Average-pool the product feature, to obtain the correlation feature of the to-be-classified image.

Pooling may be understood as compression, which means conducting aggregation statistics on features of different locations. For example, an average value of a particular feature in an area of the image is calculated as a value of the area, thus reducing dimensions and improving the result. Over-fitting does not occur easily. This aggregation operation is called pooling. Pooling includes average pooling and max pooling. The foregoing operation of using an average value of a particular feature in an area as a value of the area is called average pooling, and an operation of using a maximum value of a particular feature in an area as a value of the area is called max pooling.

After the product feature with a correlation characteristic, to avoid that too many dimensions and a large amount of data affect classification efficiency, the product feature needs to be pooled to reduce the dimensions of the product feature. In this embodiment, the product feature is average-pooled, to obtain the correlation feature, thus ensuring the accuracy of the correlation feature. And after the average pooling, the obtained correlation feature of the to-be-classified image is a feature in a form of L×L.

In one of the embodiments, step S210 of extracting a global feature of a to-be-classified image includes: performing feature extraction on the to-be-classified image according to a first convolutional neural network, to obtain the global feature of the to-be-classified image.

Step S230 of extracting a local feature of the local critical area includes: performing feature extraction on the local critical area of the to-be-classified image according to a second convolutional neural network, to obtain the local feature of the local critical area of the to-be-classified image.

A convolutional neural network is a feed-forward neural network, where an artificial neuron may respond to surrounding units and may process a large image. The convolutional neural network includes a convolution layer and a pooling layer. A feature result obtained by performing feature extraction through the convolutional neural network is a feature with three spatial dimensions, which may be understood as that a plurality of feature graphs is obtained. For example, an image A is processed through the convolutional neural network, and an obtained global feature is a feature in a form of 512×28×28, which may be understood as 512 feature graphs each with a size of 28×28, or may be understood as 28×28 single vectors with 512 dimensions, that is, there are 512 elements in a single vector. In this embodiment, feature extraction may be performed by using a corresponding convolutional neural network. When feature extraction is performed through the first convolutional neural network and the second convolutional neural network separately, it is satisfied that the obtained global feature and the obtained local feature of the local critical area have the same dimensions.

Figure 6:
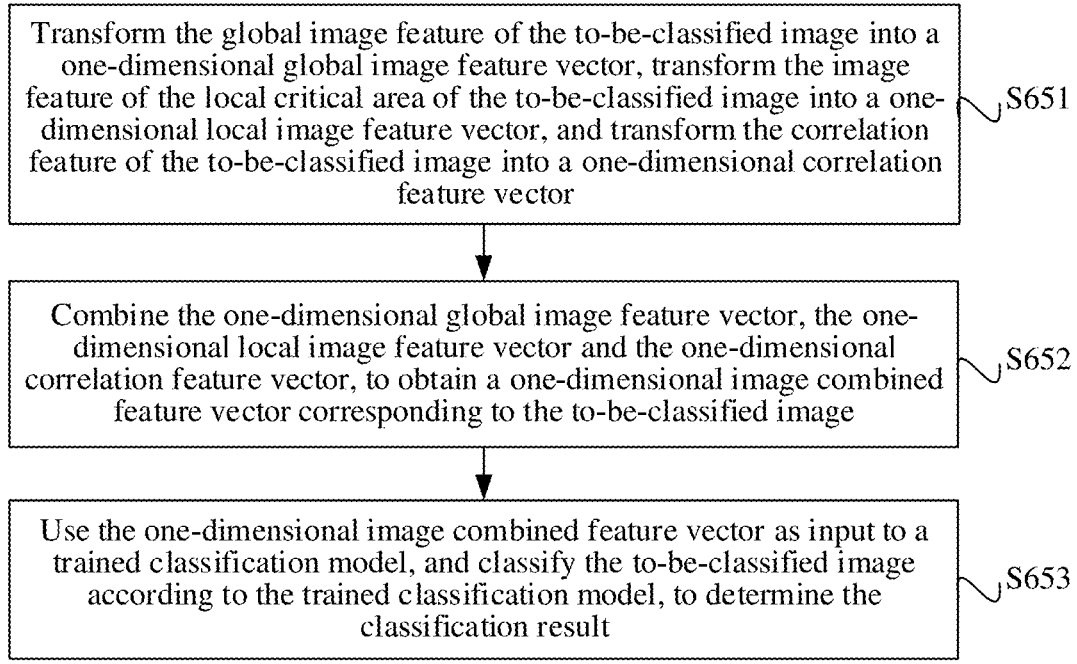
FIG. 6 is a schematic sub-flowchart of step S250 in an image classification method according to another embodiment.

As shown in FIG. 6, in one of the embodiments, step S250 of classifying the to-be-classified image to determine a classification result according to the global feature of the to-be-classified image, the local feature of the local critical area of the to-be-classified image and the correlation feature of the to-be-classified image includes the following steps:

S651: Transform the global feature of the to-be-classified image into a one-dimensional global image feature vector, transform the local feature of the local critical area of the to-be-classified image into a one-dimensional local image feature vector, and transform the correlation feature of the to-be-classified image into a one-dimensional correlation feature vector. The one-dimensional global image feature vector may refer as the one-dimensional global feature vector. The one-dimensional local image feature vector may refer as the one-dimensional local feature vector.

S652: Combine the one-dimensional global feature vector, the one-dimensional local feature vector and the one-dimensional correlation feature vector, to obtain a one-dimensional image combined feature vector corresponding to the to-be-classified image. The one-dimensional image combined feature vector may refer as the one-dimensional combined feature vector.

A quantity of elements in the one-dimensional combined feature vector is a sum of a quantity of elements in the one-dimensional global feature vector, a quantity of elements in the one-dimensional local feature vector, and a quantity of elements in the one-dimensional correlation feature vector.

S653: Use the one-dimensional combined feature vector as input to a trained classification model, and classify the to-be-classified image according to the trained classification model, to determine the classification result.

A one-dimensional vector may be understood as a row vector (which may include a plurality of columns, that is, there may be a plurality of elements in a row vector) or a column vector (which may include a plurality of columns). The global feature and the local feature of the local critical area obtained in the feature extraction process may be in a multidimensional matrix form. However, when classification is performed by using a classification model, input of the classification model needs to be in a one-dimensional vector form, and elements in the one-dimensional vector are used as input to nodes of a classification input layer. Therefore, during image classification, the obtained global feature needs to be transformed into a one-dimensional global feature vector, the local feature of the local critical area needs to be transformed into a one-dimensional local feature vector, and the correlation feature needs to be transformed into a one-dimensional correlation feature vector. Then, to improve the accuracy of classification, the one-dimensional feature vectors are combined into a one-dimensional combined feature vector, which is used as input to the trained classification model. Image classification is performed by using the trained classification model, to obtain an initial classification result. Specifically, there is a plurality of classes, and the initial classification result may be probabilities that the to-be-classified image belongs to the respective classes. According to the probabilities that the to-be-classified image belongs to the respective classes, a final classification result, that is, the classification result determined by classifying the to-be-classified image, is determined. A class corresponding to the greatest probability in the initial classification result may be used as the final classification result.

In an embodiment, the trained classification model may be a trained softmax linear regression model.

In an embodiment, in the process of transforming the image feature into a one-dimensional feature vector, elements in each dimension of the image feature may be combined into one dimension. For example, for a feature in a matrix form with a size of 10×10, after the feature is transformed into a one-dimensional vector. The one-dimensional vector may be a single row vector including 100 elements, and may be understood as a one-dimensional vector with one row and 100 columns.

In an embodiment, to avoid a problem of excessively high dimensionality due to a great quantity of elements in the one-dimensional correlation feature vector, dimensionality reduction may be performed on the one-dimensional correlation feature vector, to update the one-dimensional correlation feature vector.

Figure 7:
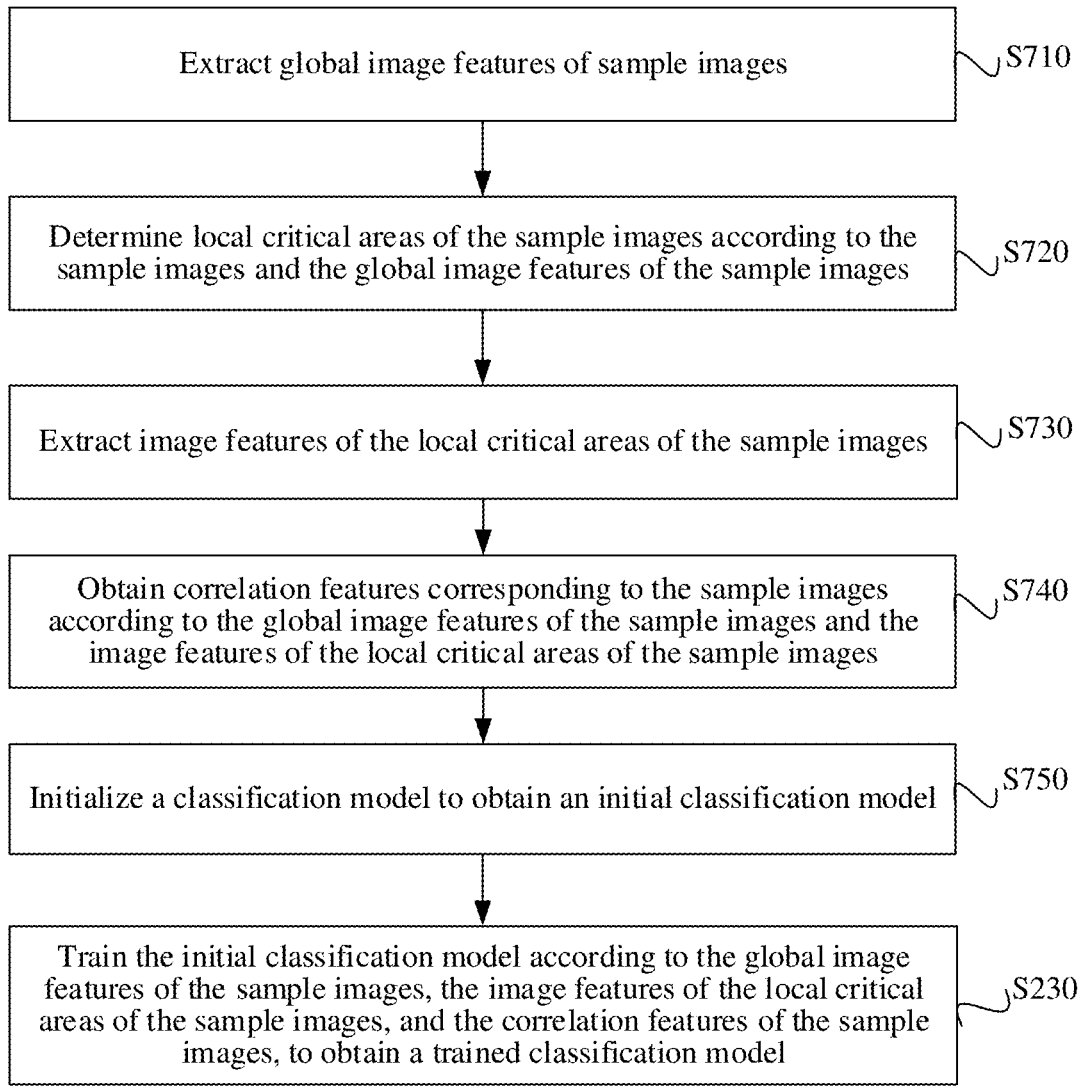
FIG. 7 is a schematic sub-flowchart before step S653 in an image classification method according to another embodiment.

As shown in FIG. 7, in one of the embodiments, before step S653 of using the one-dimensional combined feature vector as input to a trained classification model, and classifying the to-be-classified image according to the trained classification model, the method further includes the following steps:

S710: Extract global features of sample images.

S720: Determine local critical areas of the sample images according to the sample images and the global features of the sample images.

S730: Extract local features of the local critical areas of the sample images.

S740: Obtain correlation features corresponding to the sample images according to the global features of the sample images and the local features of the local critical areas of the sample images.

It may be appreciated that, before the one-dimensional combined feature vector is used as input to the trained classification model to perform classification, the trained classification model needs to be obtained, and the foregoing process is a process of obtaining the trained classification mode. In a process of prediction (that is, classifying the to-be-classified image), the global feature of the to-be-classified image, the local feature of the local critical area and the correlation feature of the to-be-classified image are used. Therefore, correspondence is required in training and prediction, to ensure the accuracy of classification according to the trained classification model.

That is, feature extraction is first performed on the sample images, to obtain the global features of the sample images, the local features of the local critical areas of the sample images and the correlation features of the sample images. The foregoing feature extraction process of the sample images is similar to the feature extraction process of the to-be-classified image, except that images from which features are to be extracted are different. In this embodiment, images from which features are to be extracted are the sample images, while in prediction, an image from which features are to be extracted is the to-be-classified image.

S750: Initialize a classification model, to obtain an initial classification model.

The classification model corresponds to a model parameter. In this case, before training, the classification model needs to be initialized, that is, a structure and the model parameter of the classification model are initialized, to obtain an initial model parameter. A training process is a process of constantly correcting the initial model parameter in the initial classification model, till a training result meets a requirement, to obtain an optimal model parameter. A classification model corresponding to the optimal model parameter is a trained model. In an embodiment, the initial classification model may be an initial softmax linear regression model.

S760: Train the initial classification model according to the global features of the sample images, the local features of the local critical areas of the sample images and the correlation features of the sample images, to obtain the trained classification model.

In this embodiment, the initial model parameter in the initial classification model is constantly corrected through the global features of the sample images, the local features of the local critical areas of the sample images and the correlation features of the sample images, to implement training the initial classification model, to obtain the trained classification model. Subsequently, the trained classification model may be used to classify the to-be-classified image.

In an embodiment, during classification according to the softmax linear regression model, gradient descent formulas in use are:

$$\frac{d\ell}{dA} = B\left(\frac{d\ell}{dx}\right) \text{ and } \frac{d\ell}{dB} = A\left(\frac{d\ell}{dx}\right),$$

where l is a cost function in the softmax linear regression model to measure a fitting level of a training sample to a linear model.

Figure 8:
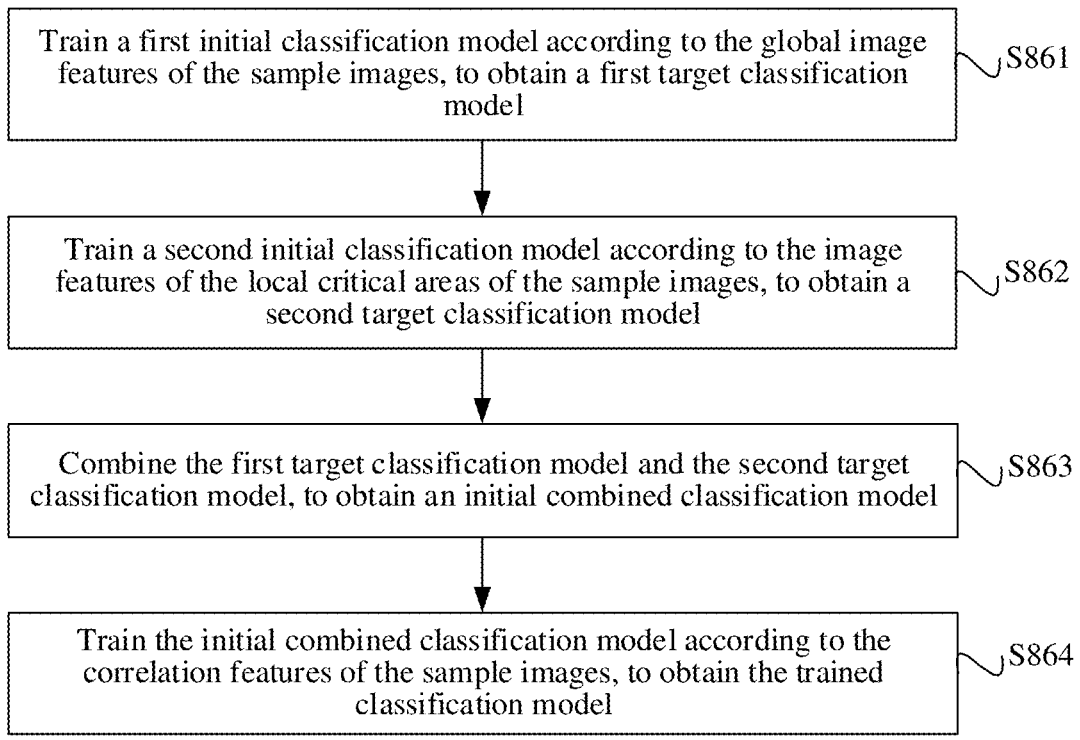
FIG. 8 is a schematic sub-flowchart of step S760 in an image classification method according to another embodiment.

As shown in FIG. 8, in one of the embodiments, the initial classification model includes a first initial classification model and a second initial classification model.

In this embodiment, step S760 of training the initial classification model according to the global features of the sample images, the local features of the local critical areas of the sample images and the correlation features of the sample images, to obtain the trained classification model includes the following steps:

S861: Train the first initial classification model according to the global features of the sample images, to obtain a first target classification model.

S862: Train the second initial classification model according to the local features of the local critical areas of the sample images, to obtain a second target classification model.

That is, for different features, corresponding initial classification models are initialized, and then the different initial classification models are trained separately according to different features. That is, the first initial classification model is obtained by initializing according to the global features of the sample images. It may be appreciated that, a quantity of nodes in an input layer of the first initial classification model is determined by a quantity of elements in the global features of the sample images. The second initial classification model is obtained by initializing according to the local features of the local critical areas of the sample images. It may be appreciated that, a quantity of nodes in an input layer of the second initial classification model is determined by a quantity of elements in the local features of the local critical areas of the sample images. In this way, two independent target classification models may be obtained.

S863: Combine the first target classification model and the second target classification model, to obtain an initial combined classification model.

S864: Train the initial combined classification model according to the correlation features of the sample images, to obtain the trained classification model.

Considering a correlation between different features, classification model training further needs to be performed according to the correlation features of the sample images. Although the foregoing two independent target classification models cannot meet a training requirement according to the correlation features, the two independent target classification models are trained separately according to the global features of the sample images and the local features of the local critical areas of the sample images on which the correlation features of the sample images are based. The two independent target classification models are correlated in a certain degree. Therefore, the first target classification model and the second target classification model are combined to obtain the initial combined classification model, and the initial combined classification model is trained according to the correlation features of the sample images, to obtain the trained classification model. In this way, both the independency of the features and the correlation between the features are considered, thus improving the accuracy of the trained classification model, and further improving the accuracy of classification. In an embodiment, the first initial classification model and the second initial classification model each may be an initial softmax linear regression model.

In an embodiment, the first target classification model corresponds to a model structure and a trained model parameter, and the second target classification model corresponds to a model structure and a trained model parameter. The initial combined classification model obtained by combining the two classification models may be understood as that, a corresponding structure is corresponding superposition of nodes of layers in the two classification models, and a corresponding model parameter is superposition of the model parameters of the two classification models. For example, the first target classification model and the second target classification model are three-layer structures. The first layer of the first target classification model includes 512 input nodes, the second layer includes 500 nodes, and the third layer includes 5 nodes (may be understood as an output layer). The first layer of the second target classification model includes 512 input nodes, the second layer includes 500 nodes, and the third layer includes 5 nodes. When the two classification models are combined, the input nodes of the first layers of the two classification models are superposed to obtain 1024 input nodes, the nodes of the second layers of the two classification models are superposed to obtain 1000 nodes, and the nodes of the third layers of the two classification models are superposed to obtain 10 nodes. The trained model parameters of the two classification models are reserved. Other missing model parameters (model parameters between the nodes from different classification models in two layers are missing in an early stage of the combination) are initialized to obtain the initial combined classification model.

In another embodiment, the initial classification model may be obtained by initializing according to the global features of the sample images, the local features of the local critical areas of the sample images and the correlation features of the sample images. It may be appreciated that, the quantity of nodes in the input layer of the initial classification model is determined by a sum of the quantity of elements in the global features of the sample images, a quantity of elements in the local features of the local critical areas of the sample images and a quantity of elements in the correlation features of the sample images. In this case, a sample combined feature may be obtained by combining the global features of the sample images, the local features of the local critical areas of the sample images and the correlation features of the sample images, and the initial classification model is trained according to the sample combined feature to obtain the trained classification model.

In this embodiment, a formula for obtaining a classification label by classifying the to-be-classified image according to the trained classification model is:

$$label2 = \text{Arg max}(\sigma_s(c, W2, b2)).$$

W2 is a weight matrix, b2 is a bias vector, and c is a one-dimensional combined feature vector.

The following specifically describes the image classification method with reference to a specific embodiment.

Figure 9:
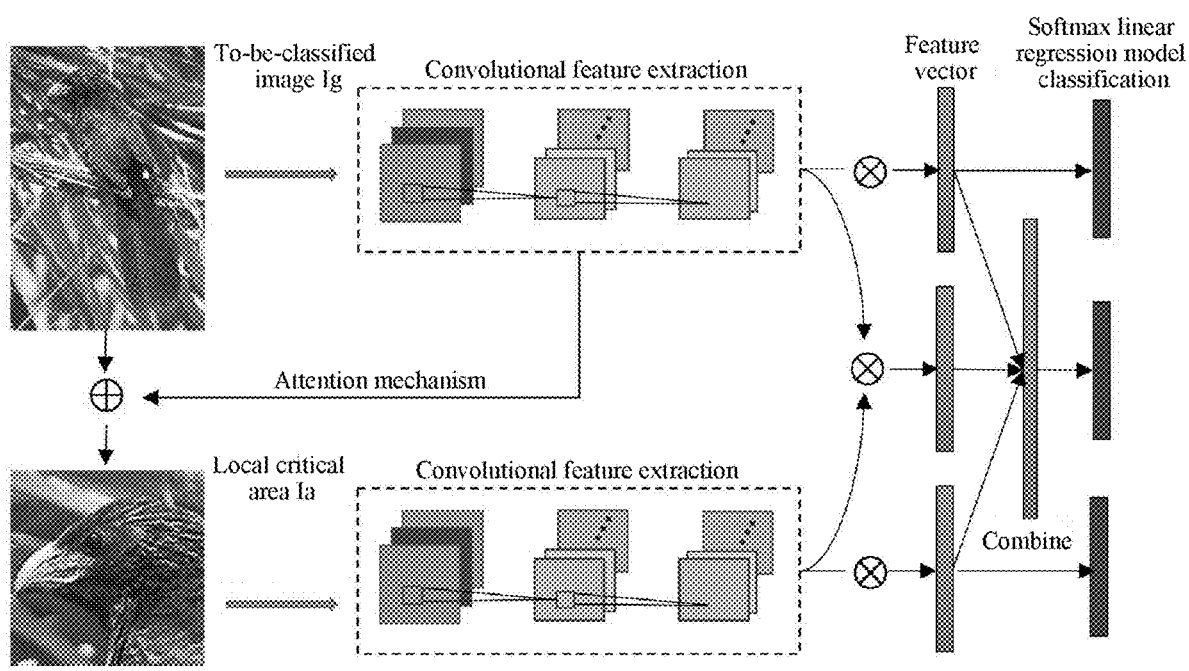
FIG. 9 is a principle diagram of an image classification method according to a specific embodiment.

FIG. 9 is a principle diagram of classification through the image classification method of this specific embodiment. First, feature extraction is performed on a to-be-classified image Ig according to a convolutional neural network, to obtain a global feature A.

Then, a local critical area Ia of the to-be-classified image Ig is obtained according to the to-be-classified image Ig, the global feature A of the to-be-classified image Ig, and an attention mechanism.

Next, feature extraction is performed on the local critical area Ia according to a convolutional neural network, to obtain a local feature B of the local critical area Ia.

Further, the global feature A of the to-be-classified image Ig and the image feature B of the local critical area Ia each have a classification channel corresponding to a single softmax linear regression model. That is, image classification may be performed according to a one-dimensional global feature and the softmax linear regression model corresponding to the global feature A of the to-be-classified image Ig, or may be performed according to a one-dimensional local feature vector and the softmax linear regression model corresponding to the image feature B of the local critical area Ia.

To enrich feature types and improve the accuracy by classifying through rich feature information, a correlation feature is determined according to the global feature A of the to-be-classified image Ig and the image feature B of the local critical area Ia. The one-dimensional global feature corresponding to the global feature A of the to-be-classified image Ig, the one-dimensional local feature vector corresponding to the image feature B of the local critical area Ia and a one-dimensional correlation feature vector corresponding to the correlation feature may be combined to obtain a one-dimensional combined feature vector corresponding to the to-be-classified image. The one-dimensional combined feature vector is used as input to a trained classification model, and the to-be-classified image is classified according to the trained classification model, so that the accuracy of classification may be improved.

In conclusion, the image classification method of this specific embodiment may improve a classification capability, ensure the accuracy of classification, facilitate the subsequent search by users, and provide a good basis for personalized image recommendation.

Figure 10:
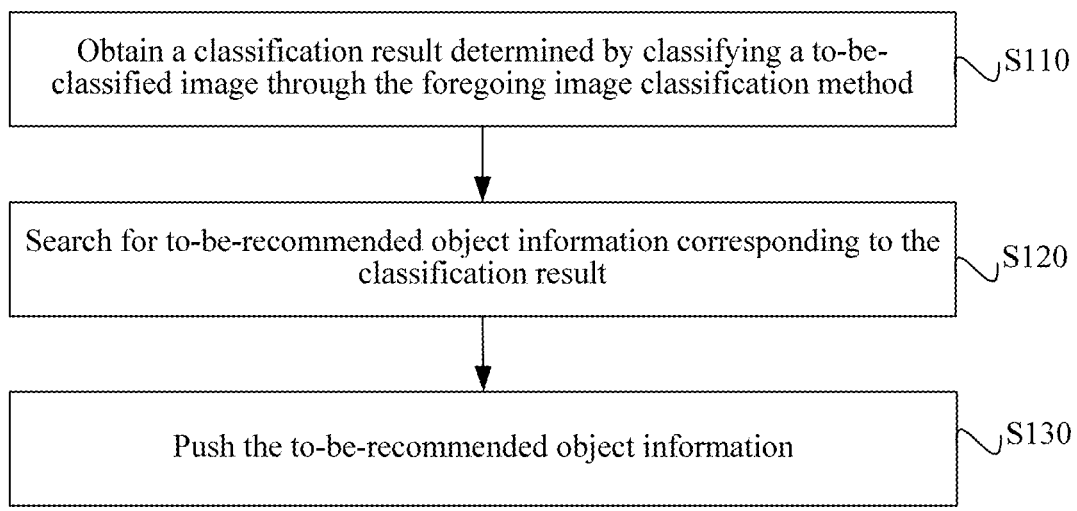
FIG. 10 is a flowchart of a personalized recommendation method according to an embodiment.

The foregoing image classification method may be applied to fields such as personalized recommendation, robot visual recognition and autopilot object recognition. Using personalized recommendation as an example, as shown in FIG. 10, this application further provides an embodiment of a personalized recommendation method. This embodiment is mainly illustrated by using an example that the method is applied to the server 120 in FIG. 1. The method includes the following steps:

S110: Obtain a classification result determined by classifying a to-be-classified image through the foregoing image classification method.

An accurate classification result may be obtained by classifying the to-be-classified image through the foregoing image classification method.

S120: Search for to-be-recommended object information corresponding to the classification result. To search for to-be-recommended object information corresponding to the classification result may include to search for to-be-recommended information to a user based on the classification result.

S130: Push the to-be-recommended object information. To push the to-be-recommended object information may include to push the to-be-recommended object information to the user, such that the user may view the to-be-recommended object information.

An object may be understood as a target transaction. Information of objects may be stored in a preset recommendation information database, where the objects may include a commodity, an image, an item, a person and the like. Different users use different images in a terminal. The images may be used for providing personalized recommendation for a user. First, the images are classified, to obtain an accuracy classification result, and to-be-recommended object information corresponding to the classification result is searched for, to improve the accuracy of the to-be-recommended object information. Then, the to-be-recommended object information is pushed to realize personalized recommendation, so that the user may view the information.

Specifically, the personalized recommendation method may be applied to a server or a terminal. When the method is applied to a server, step S130 of pushing the to-be-recommended object information may be specifically transmitting the to-be-recommended object information to a terminal, and the user may view the received to-be-recommended object information on the terminal. In addition, when the personalized recommendation method is applied to a terminal, to-be-recommended object information is searched for on the terminal, to obtain the to-be-recommended object information on the terminal. The user may view the terminal to obtain the to-be-recommended object information.

In an embodiment, when the personalized recommendation method is applied to a server, in a case that the image classification method is applied to the server, after the server determines the classification result through the image classification method, the classification result determined by the server may be obtained directly; the to-be-recommended object information is searched for according to the classification result, and is recommended to a terminal. In a case that the personalized recommendation method is applied to a terminal, a server may obtain the classification result of the to-be-classified image from the terminal, and the server may also determine the classification result according to the global feature of the to-be-classified image, the local feature of the local critical area and the correlation feature. The to-be-recommended object information may be searched for later based on the classification result and be recommended to the terminal.

When the personalized recommendation method is applied to a terminal, in a case that the image classification method is applied to a server, the terminal may obtain the classification result of the to-be-classified image from the server, and the terminal may also determine the classification result according to the global feature of the to-be-classified image, the local feature of the local critical area and the correlation feature. The to-be-recommended object information is then searched for based on the classification result and pushed to the user. In a case that the image classification method is applied to the terminal, after determining the classification result of the to-be-classified image through the image classification method, the terminal may directly obtain the classification result and search for the to-be-recommended object information according to the classification result, and then push the to-be-recommended object information to the user.

In the foregoing personalized recommendation method, a classification result determined through the foregoing image classification method, to improve the accuracy of the classification result; then, when corresponding to-be-recommended object information is searched for according to the classification result, the to-be-recommended object information may be accurately obtained and pushed, thus realizing recommendation of the to-be-recommended object information, and improving the accuracy of recommendation.

Figure 11:
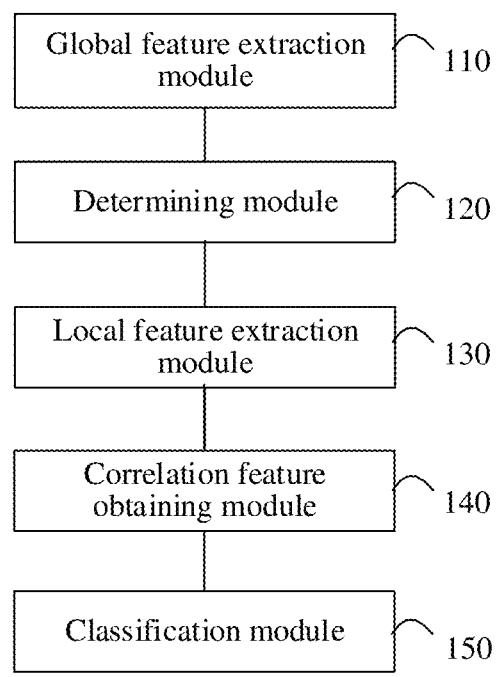
FIG. 11 is a schematic diagram of modules of an image classification apparatus according to an embodiment.

As shown in FIG. 11, an image classification apparatus of an embodiment is provided. The image classification apparatus may be disposed in the server 120 or the terminal 110 of FIG. 1 and includes:

a global feature extraction module 110, configured to extract a global feature of a to-be-classified image;

a determining module 120, configured to determine a local critical area of the to-be-classified image according to the to-be-classified image and the global feature of the to-be-classified image;

a local feature extraction module 130, configured to extract a local feature of the local critical area of the to-be-classified image;

a correlation feature obtaining module 140, configured to obtain a correlation feature of the to-be-classified image according to the global feature of the to-be-classified image and the local feature of the local critical area of the to-be-classified image; and a classification module 150, configured to classify the to-be-classified image to determine a classification result according to the global feature of the to-be-classified image, the local feature of the local critical area of the to-be-classified image and the correlation feature of the to-be-classified image.

Through the foregoing image classification apparatus, the to-be-classified image is classified according to the global feature, the local feature of the local critical area and the correlation feature. That is, in a process of image classification, not only the global feature but also the local feature of the local critical area is considered, thus enriching local feature information on which image classification is based. When image classification is performed according to the rich feature information, the classification may be accurate, thus improving the accuracy of image classification.

Figure 12:
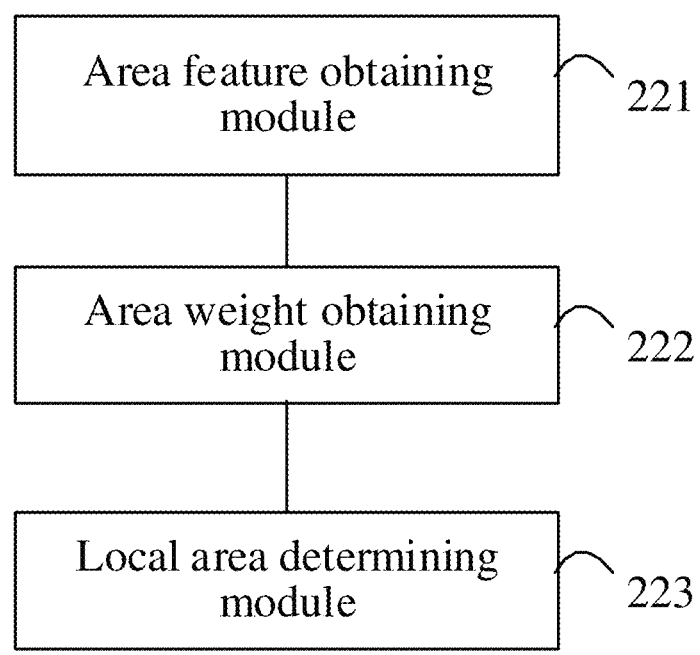
FIG. 12 is a schematic diagram of sub-modules of a determining module 120 in an image classification apparatus according to another embodiment.

As shown in FIG. 12, in one of the embodiments, the determining module 120 includes:

an area feature obtaining module 221, configured to obtain sub-image features corresponding to sub-areas of the to-be-classified image according to the global feature of the to-be-classified image;

an area weight obtaining module 222, configured to obtain weights corresponding to the sub-image features of the sub-areas; and a local area determining module 223, configured to determine the local critical area of the to-be-classified image according to the sub-image features of the sub-areas, the weights of the sub-image features of the sub-areas and the to-be-classified image.

Figure 13:
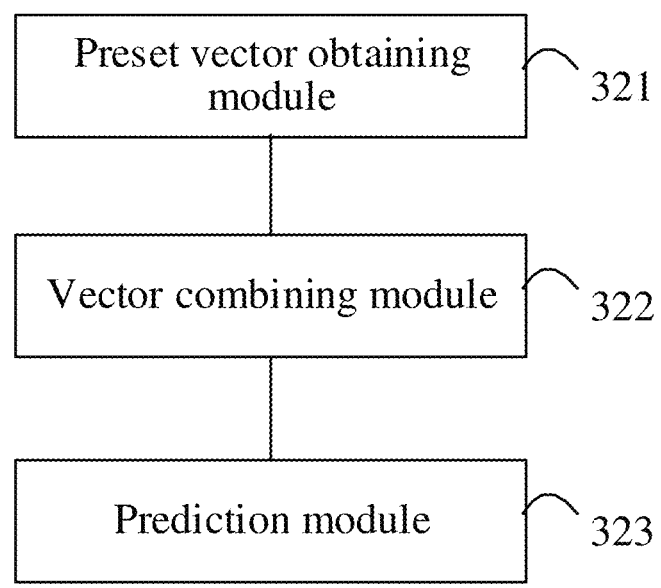
FIG. 13 is a schematic diagram of sub-modules of an area weight obtaining module 222 in an image classification apparatus according to another embodiment.

As shown in FIG. 13, in one of the embodiments, the area weight obtaining module 222 includes:

a preset vector obtaining module 321, configured to obtain a preset high-dimensional feature vector;

a vector combining module 322, configured to combine the sub-image features of the sub-areas with the preset high-dimensional feature vector separately, to obtain combined features of the sub-areas; and a prediction module 323, configured to use the combined features of the sub-areas as input to a multilayer perceptron (MLP), and perform prediction according to the MLP to obtain the weights corresponding to the sub-image features of the sub-areas.

Figure 14:
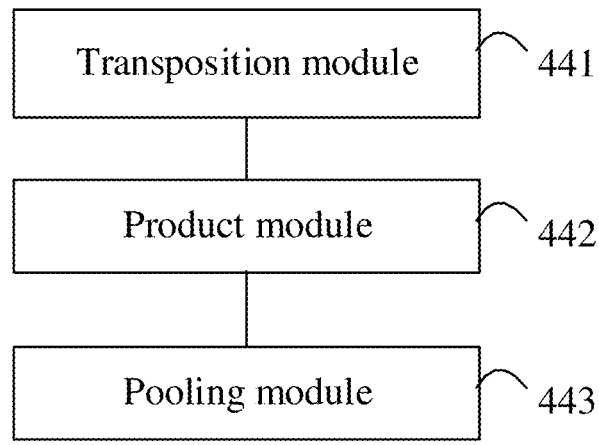
FIG. 14 is a schematic diagram of sub-modules of a correlation feature obtaining module 140 in an image classification apparatus according to another embodiment.

As shown in FIG. 14, in one of the embodiments, the correlation feature obtaining module 140 includes:

a transposition module 441, configured to transpose the global feature of the to-be-classified image, to obtain a transposed feature;

a product module 442, configured to multiply the transposed feature by the sub-image feature of the local critical area of the to-be-classified image, to obtain a product feature; and a pooling module 443, configured to average-pool the product feature, to obtain the correlation feature.

In one of the embodiments, the global feature extraction module 110 is specifically configured to perform feature extraction on the to-be-classified image according to a first convolutional neural network, to obtain the global feature of the to-be-classified image.

The local feature extraction module 130 is specifically configured to perform feature extraction on the local critical area of the to-be-classified image according to a second convolutional neural network, to obtain the local feature of the local critical area of the to-be-classified image.

Figure 15:
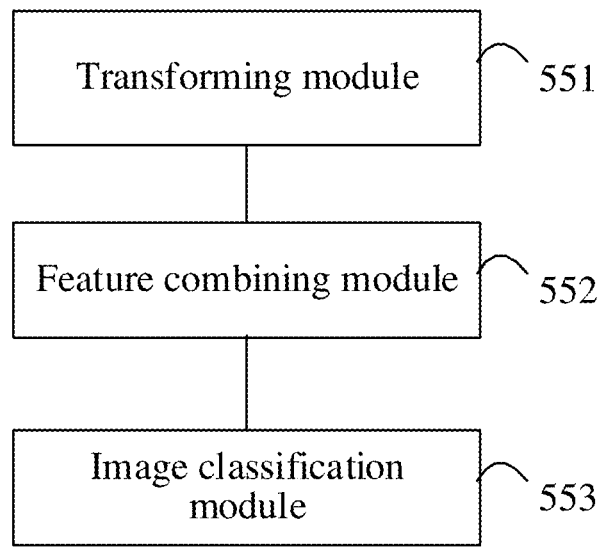
FIG. 15 is a schematic diagram of sub-modules of a classification module 150 in an image classification apparatus according to another embodiment.

As shown in FIG. 15, in one of the embodiments, the classification module 150 includes:

a transforming module 551, configured to transform the global feature of the to-be-classified image into a one-dimensional global feature vector, transform the local feature of the local critical area of the to-be-classified image into a one-dimensional local feature vector, and transform the correlation feature of the to-be-classified image into a one-dimensional correlation feature vector;

a feature combining module 552, configured to combine the one-dimensional global feature vector, the one-dimensional local feature vector and the one-dimensional correlation feature vector, to obtain a one-dimensional combined feature vector corresponding to the to-be-classified image, where a quantity of elements in the one-dimensional combined feature vector is a sum of a quantity of elements in the one-dimensional global feature vector, a quantity of elements in the one-dimensional local feature vector, and a quantity of elements in the one-dimensional correlation feature vector; and an image classification module 553, configured to use the one-dimensional combined feature vector as input to a trained classification model, and classify the to-be-classified image according to the trained classification model.

In one of the embodiments, the image classification apparatus further includes an initialization module and a training module.

The global feature extraction module 110 is further configured to extract a global feature of the sample image.

The determining module 120 is further configured to determine a local critical area of the sample image according to the sample image and the global feature of the sample image.

The local feature extraction module 130 is further configured to extract a local feature of the local critical area of the sample image.

The correlation feature obtaining module 140 is further configured to obtain a correlation feature of the sample image according to the global feature of the sample image and the local feature of the local critical area of the sample image.

The initialization module is configured to initialize a classification model, to obtain an initial classification model.

The training module is configure to train the initial classification model according to the global features of the sample images, the local features of the local critical areas of the sample images and the correlation features of the sample images, to obtain the trained classification model.

In one of the embodiments, the initial classification model includes a first initial classification model and a second initial classification model.

In this embodiment, the training module includes: a first training module, a second training module, a model combining module and a third training module.

The first training module is configured to train the first initial classification model according to the global features of the sample images, to obtain a first target classification model.

The second training module is configured to train the second initial classification model according to the local features of the local critical areas of the sample images, to obtain a second target classification model.

The model combining module is configured to combine the first target classification model and the second target classification model, to obtain an initial combined classification model.

The third training module is configured to train the initial combined classification model according to the correlation features of the sample images, to obtain the trained classification model.

In another embodiment, the initial classification model may be obtained by initializing according to the global features of the sample images, the local features of the local critical areas of the sample images and the correlation features of the sample images. It may be appreciated that, the quantity of nodes in the input layer of the initial classification model is determined by a sum of the quantity of elements in the global features of the sample images, a quantity of elements in the local features of the local critical areas of the sample images and a quantity of elements in the correlation features of the sample images. In this case, a sample combined feature may be obtained by combining the global features of the sample images, the local features of the local critical areas of the sample images and the correlation features of the sample images, and the initial classification model is trained according to the sample combined feature to obtain the trained classification model.

Technical features of the image classification apparatus correspond to technical features of the image classification method, and are not described herein again.

Figure 16:
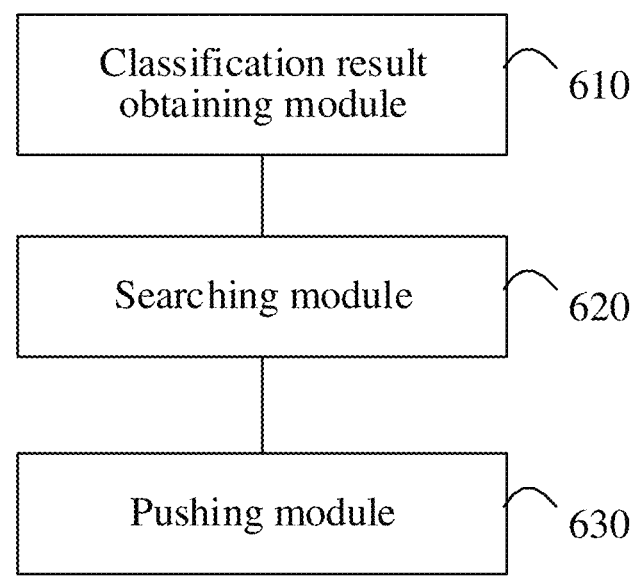
FIG. 16 is a schematic diagram of modules of a personalized recommendation apparatus according to an embodiment.

As shown in FIG. 16, this application further provides a personalized recommendation apparatus of an embodiment. The personalized recommendation apparatus may be disposed in the server 120 or the terminal 110 of FIG. 1 and includes:

a classification result obtaining module 610, configured to obtain a classification result determined by classifying the to-be-classified image through the image classification apparatus;

a searching module 620, configured to search for to-be-recommended object information corresponding to the classification result; and a pushing module 630, configured to push the to-be-recommended object information.

Through the foregoing personalized recommendation apparatus, a classification result determined through the foregoing image classification method is obtained, to improve the accuracy of the classification result; then, when corresponding to-be-recommended object information is searched for according to the classification result, the to-be-recommended object information may be accurately obtained and pushed, thus realizing recommendation of the to-be-recommended object information, and improving the accuracy of recommendation.

Figure 17:
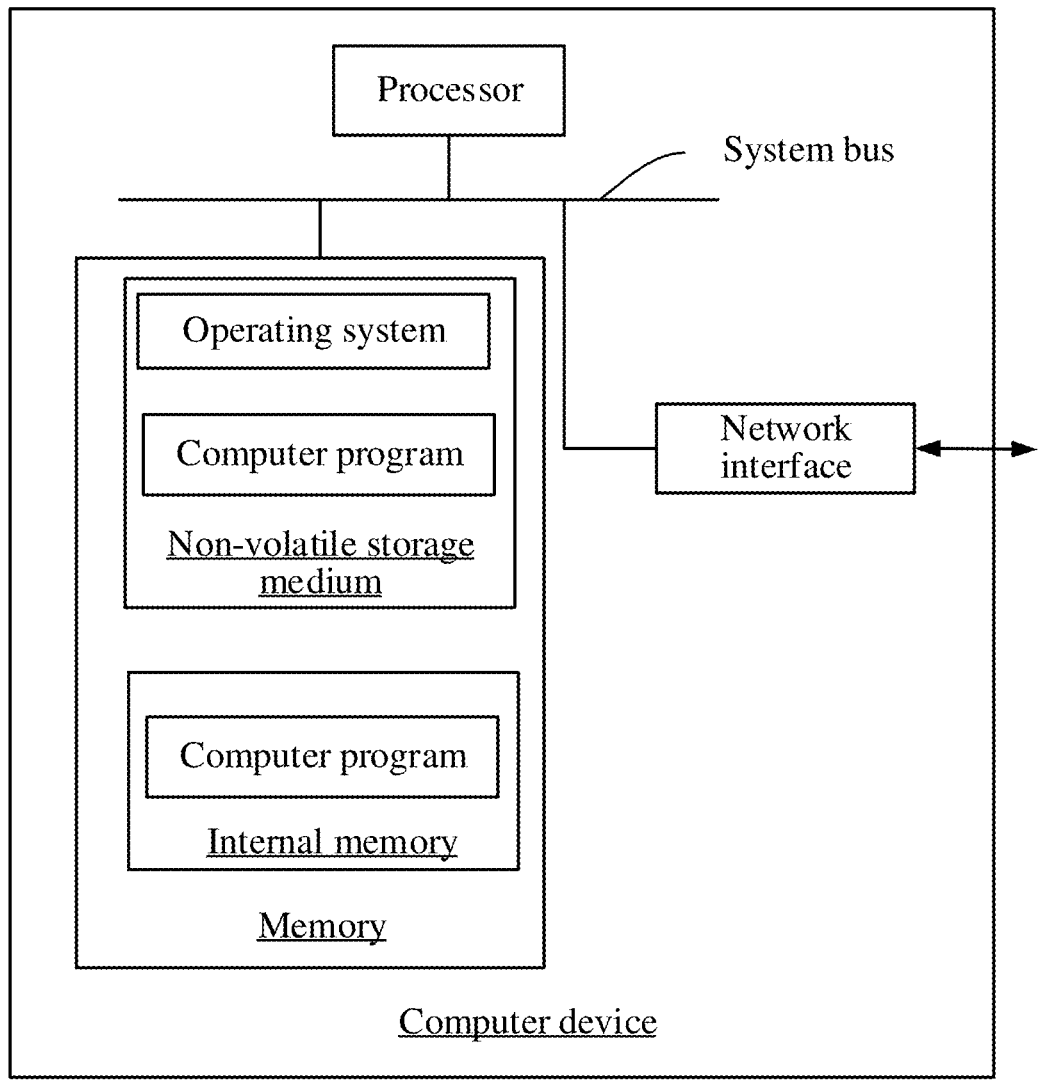
FIG. 17 is a block diagram of a structure of a computer device according to an embodiment.

FIG. 17 is a diagram of an internal structure of a computer device according to an embodiment. The computer device may specifically be the terminal 110 or the server 120 in FIG. 1, and it may be appreciated that, the foregoing method may be implemented by the computer device. As shown in FIG. 17, the computer device includes a processor, a memory, and a network interface that are connected through a system bus. The memory includes a non-volatile storage medium and an internal memory. The non-volatile storage medium of the computer device stores an operating system, and may further store a computer program, the computer program, when executed by the processor, causing the processor to implement the foregoing image classification method and the personalized recommendation method. The processor of the computer device is configured to provide calculation and control capabilities, to support operation of the entire computer device. The internal memory may further store a computer program, the computer program, when executed by the processor, causing the processor to implement the image classification method and the personalized recommendation method. The network interface is configured to connect to and communicate with the network 130. When the computer device is the terminal 110, the computer device may further include an input apparatus and a display, where the display screen of the terminal may be a liquid crystal display screen, an e-ink display screen, or the like. The input apparatus of the computer device may be a touch layer covering the display screen, or may be a key, a track ball, or a touchpad disposed on a housing of the computer device, or may be an external keyboard, touchpad, or mouse.

A person skilled in the art may understand that, the structure shown in FIG. 17 is only a block diagram of a part of a structure related to a solution of this application and does not limit the computer device to which the solution of this application is applied. Specifically, the computer device may include more or less members than those in the drawings, or include a combination of some members, or include different member layouts.

In an embodiment, the image classification apparatus provided in this application may be implemented in a form of a computer program, and the computer program may run on the computer device shown in FIG. 17. The memory of the computer device may store various program modules that make up the image classification apparatus, for example, the global feature extraction module 110, the determining module 120, the local feature extraction module 130, the correlation feature obtaining module 140 and the classification module 150 shown in FIG. 11. The computer program formed by the various program modules causes the processor to perform the steps of the image classification method described in the embodiments of this application in this specification.

For example, the computer device shown in FIG. 17 may perform step S210 through the global feature extraction module 110 in the image classification apparatus shown in FIG. 11. The computer device may perform step S220 through the determining module 120. The computer device may perform step S230 through the local feature extraction module 130. The computer device may perform step S240 through the correlation feature obtaining module 140. The computer device may perform step S240 through the classification module 150.

In an embodiment, the personalized recommendation apparatus provided in this application may be implemented in a form of a computer program, and the computer program may run on the computer device shown in FIG. 17. The memory of the computer device may store various program modules that make up the personalized recommendation apparatus. The computer program formed by the various program modules causes the processor to perform the steps of the personalized recommendation method described in the embodiments of this application in this specification.

This application provides a computer device of an embodiment, including a memory, a processor and a computer program stored in the memory and executable by the processor. The processor, when executing the computer program, implements the steps in the foregoing image classification method.

This application provides a computer device of an embodiment, including a memory, a processor and a computer program stored in the memory and executable by the processor. The processor, when executing the computer program, implements the steps of the foregoing personalized recommendation method.

This application provides a computer readable storage medium of an embodiment, storing a computer program. The computer program, when executed by a processor, implements the steps in the foregoing image classification method.

This application provides a computer readable storage medium of an embodiment, storing a computer program. The computer program, when executed by a processor, implements the steps in the foregoing personalized recommendation method.

A person of ordinary skill in the art may understand that all or some of the processes of the methods of the foregoing embodiments may be implemented by a computer program instructing relevant hardware. The program may be stored in a non-volatile computer readable storage medium. When the program is executed, the program may include the processes of the embodiments of the foregoing methods. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be randomly combined. For concise description, not all possible combinations of the technical features in the embodiment are described. However, the combinations of the technical features should all be considered as falling within the scope described in this specification provided that they do not conflict with each other.

The foregoing embodiments only show several implementations of this application and are described in detail, but they should not be construed as a limit to the patent scope of this application. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A method for classifying an input image, the method comprising:
   extracting, by a device comprising a memory storing instructions and a processor in communication with the memory, a global feature of the input image;
   determining, by the device, a local critical area of the input image based on the input image and the global feature of the input image;
   extracting, by the device, a local feature of the local critical area of the input image;
   obtaining, by the device, a correlation feature of the input image based on the global feature of the input image and the local feature of the local critical area of the input image, by:
      obtaining, by the device, sub-image features corresponding to sub-areas of the input image based on the global feature of the input image,
      obtaining, by the device, weights of the sub-image features of the sub-areas, and
      determining, by the device, the local critical area of the input image based on the sub-image features of the sub-areas, the weights of the sub-image features of the sub-areas, and the input image; and
   classifying, by the device, the input image to obtain a classification result based on the global feature of the input image, the local feature of the local critical area of the input image, and the correlation feature of the input image.

2. The method according to claim 1, wherein the obtaining the weights of the sub-image features of the sub-areas comprises:
   obtaining, by the device, a preset high-dimensional feature vector;
   combining, by the device, the sub-image features of the sub-areas with the preset high-dimensional feature vector, to obtain combined features of the sub-areas;
   sending, by the device, the combined features of the sub-areas as input to a multilayer perceptron (MLP); and
   performing, by the device, prediction according to the MLP to obtain the weights of the sub-image features of the sub-areas.

3. The method according to claim 1, wherein the obtaining the correlation feature of the input image based on the global feature of the input image and the local feature of the local critical area of the input image comprises:

transposing, by the device, the global feature of the input image, to obtain a transposed global feature;

multiplying, by the device, the transposed global feature by the local feature of the local critical area of the input image, to obtain a product feature; and average-pooling, by the device, the product feature, to obtain the correlation feature of the input image.

4. The method according to claim 1, wherein:
the extracting the global feature of a input image comprises:
performing, by the device, feature extraction on the input image according to a first convolutional neural network, to obtain the global feature of the input image; and
the extracting the local feature of the local critical area comprises:
performing, by the device, feature extraction on the local critical area of the input image according to a second convolutional neural network, to obtain the local feature of the local critical area of the input image.

5. The method according to claim 1, wherein the classifying the input image to obtain the classification result based on the global feature of the input image, the local feature of the local critical area of the input image, and the correlation feature of the input image comprises:
transforming, by the device, the global feature of the input image into a one-dimensional global feature vector, transforming the local feature of the local critical area of the input image into a one-dimensional local feature vector, and transforming the correlation feature of the input image into a one-dimensional correlation feature vector;
combining, by the device, the one-dimensional global feature vector, the one-dimensional local feature vector, and the one-dimensional correlation feature vector, to obtain a one-dimensional combined feature vector corresponding to the input image, wherein a quantity of elements in the one-dimensional combined feature vector is a sum of a quantity of elements in the one-dimensional global feature vector, a quantity of elements in the one-dimensional local feature vector, and a quantity of elements in the one-dimensional correlation feature vector; and
sending, by the device, the one-dimensional combined feature vector as input to a trained classification model, and classifying the input image to obtain the classification result according to the trained classification model.

6. The method according to claim 1, further comprising:
searching, by the device, for to-be-recommended information to a user based on the classification result; and
sending, by the device, the to-be-recommended information to the user.

7. A computer device for classifying an input image, comprising:
a memory storing instructions; and
a processor in communication with the memory, wherein, when the instructions are executed by the processor, the instructions are configured to cause the computer device to perform:
extracting a global feature of a input image;
determining a local critical area of the input image based on the input image and the global feature of the input image by:
obtaining sub-image features corresponding to sub-areas of the input image based on the global feature of the input image,
obtaining weights of the sub-image features of the sub-areas, and
determining the local critical area of the input image based on the sub-image features of the sub-areas, the weights of the sub-image features of the sub-areas, and the input image;
extracting an local feature of the local critical area of the input image;
obtaining a correlation feature of the input image based on the global feature of the input image and the local feature of the local critical area of the input image; and
classifying the input image to obtain a classification result based on the global feature of the input image, the local feature of the local critical area of the input image and the correlation feature of the input image.

8. The computer device according to claim 7, wherein, when the instructions are configured to cause the computer device to perform obtaining the weights of the sub-image features of the sub-areas, the instructions are configured to cause the computer device to perform:
obtaining a preset high-dimensional feature vector;
combining the sub-image features of the sub-areas with the preset high-dimensional feature vector, to obtain combined features of the sub-areas;
sending the combined features of the sub-areas as input to a multilayer perceptron (MLP); and
performing prediction according to the MLP to obtain the weights of the sub-image features of the sub-areas.

9. The computer device according to claim 7, wherein, when the instructions are configured to cause the computer device to perform obtaining the correlation feature of the input image based on the global feature of the input image and the local feature of the local critical area of the input image, the instructions are configured to cause the computer device to perform:
transposing the global feature of the input image, to obtain a transposed global feature;
multiplying the transposed global feature by the local feature of the local critical area of the input image, to obtain a product feature; and
average-pooling the product feature, to obtain the correlation feature of the input image.

10. The computer device according to claim 7, wherein:
when the instructions are configured to cause the computer device to perform extracting the global feature of a input image, the instructions are configured to cause the computer device to perform:
performing feature extraction on the input image according to a first convolutional neural network, to obtain the global feature of the input image; and
when the instructions are configured to cause the computer device to perform extracting the local feature of the local critical area, the instructions are configured to cause the computer device to perform:
performing feature extraction on the local critical area of the input image according to a second convolutional neural network, to obtain the local feature of the local critical area of the input image.

11. The computer device according to claim 7, wherein, when the instructions are configured to cause the computer device to perform classifying the input image to obtain the classification result based on the global feature of the input image, the local feature of the local critical area of the input image, and the correlation feature of the input image, the instructions are configured to cause the computer device to perform:
  transforming the global feature of the input image into a one-dimensional global feature vector, transforming the local feature of the local critical area of the input image into a one-dimensional local feature vector, and transforming the correlation feature of the input image into a one-dimensional correlation feature vector;
  combining the one-dimensional global feature vector, the one-dimensional local feature vector, and the one-dimensional correlation feature vector, to obtain a one-dimensional combined feature vector corresponding to the input image, wherein a quantity of elements in the one-dimensional combined feature vector is a sum of a quantity of elements in the one-dimensional global feature vector, a quantity of elements in the one-dimensional local feature vector, and a quantity of elements in the one-dimensional correlation feature vector; and
  sending the one-dimensional combined feature vector as input to a trained classification model, and classifying the input image to obtain the classification result according to the trained classification model.

12. The computer device according to claim 7, wherein, when the instructions are executed by the processor, the instructions are configured to further cause the computer device to perform:
  searching for to-be-recommended information to a user based on the classification result; and
  sending the to-be-recommended information to the user.

13. A non-transitory computer readable storage medium storing computer readable instructions, wherein, the computer readable instructions, when executed by a processor, are configured to cause the processor to perform:
  extracting a global feature of an input image;
  determining a local critical area of the input image based on the input image and the global feature of the input image by:
    obtaining sub-image features corresponding to sub-areas of the input image based on the global feature of the input image,
    obtaining weights of the sub-image features of the sub-areas, and
    determining the local critical area of the input image based on the sub-image features of the sub-areas, the weights of the sub-image features of the sub-areas, and the input image;
  extracting an local feature of the local critical area of the input image;
  obtaining a correlation feature of the input image based on the global feature of the input image and the local feature of the local critical area of the input image; and
  classifying the input image to obtain a classification result based on the global feature of the input image, the local feature of the local critical area of the input image and the correlation feature of the input image.

14. The non-transitory computer readable storage medium according to claim 13, wherein, when the computer readable instructions are configured to cause the processor to perform obtaining the weights of the sub-image features of the sub-areas, the computer readable instructions are configured to cause the processor to perform:
  obtaining a preset high-dimensional feature vector;
  combining the sub-image features of the sub-areas with the preset high-dimensional feature vector, to obtain combined features of the sub-areas;
  sending the combined features of the sub-areas as input to a multilayer perceptron (MLP); and
  performing prediction according to the MLP to obtain the weights of the sub-image features of the sub-areas.

15. The non-transitory computer readable storage medium according to claim 13, wherein, when the computer readable instructions are configured to cause the processor to perform obtaining the correlation feature of the input image based on the global feature of the input image and the local feature of the local critical area of the input image, the computer readable instructions are configured to cause the processor to perform:
  transposing the global feature of the input image, to obtain a transposed global feature;
  multiplying the transposed global feature by the local feature of the local critical area of the input image, to obtain a product feature; and
  average-pooling the product feature, to obtain the correlation feature of the input image.

16. The non-transitory computer readable storage medium according to claim 13, wherein:
  when the computer readable instructions are configured to cause the processor to perform extracting the global feature of a input image, the computer readable instructions are configured to cause the processor to perform:
    performing feature extraction on the input image according to a first convolutional neural network, to obtain the global feature of the input image; and
  when the computer readable instructions are configured to cause the processor to perform extracting the local feature of the local critical area, the computer readable instructions are configured to cause the processor to perform:
    performing feature extraction on the local critical area of the input image according to a second convolutional neural network, to obtain the local feature of the local critical area of the input image.

17. The non-transitory computer readable storage medium according to claim 13, wherein, when the computer readable instructions are configured to cause the processor to perform classifying the input image to obtain the classification result based on the global feature of the input image, the local feature of the local critical area of the input image, and the correlation feature of the input image, the computer readable instructions are configured to cause the processor to perform:
  transforming the global feature of the input image into a one-dimensional global feature vector, transforming the local feature of the local critical area of the input image into a one-dimensional local feature vector, and transforming the correlation feature of the input image into a one-dimensional correlation feature vector;
  combining the one-dimensional global feature vector, the one-dimensional local feature vector, and the one-dimensional correlation feature vector, to obtain a one-dimensional combined feature vector corresponding to the input image, wherein a quantity of elements in the one-dimensional combined feature vector is a sum of a quantity of elements in the one-dimensional global feature vector, a quantity of elements in the one-dimensional local feature vector, and a quantity of elements in the one-dimensional correlation feature vector; and
  sending the one-dimensional combined feature vector as input to a trained classification model, and classifying the input image to obtain the classification result according to the trained classification model.

\* \* \* \* \*